United States Patent [19]
Boismier

[11] 3,768,858
[45] Oct. 30, 1973

[54] TRUCK BOX COVER

[76] Inventor: Albert George Joseph Boismier, Windsor, Ontario, Canada

[22] Filed: Dec. 23, 1971

[21] Appl. No.: 211,404

[30] Foreign Application Priority Data
Nov. 19, 1971 Canada.............................. 128078

[52] U.S. Cl............................................ 296/137 B
[51] Int. Cl.............................................. B60j 7/10
[58] Field of Search................. 296/100, 137 B, 26, 296/23 C; 160/14, 118, 206

[56] References Cited
UNITED STATES PATENTS

| | | | |
|---|---|---|---|
| 335,718 | 2/1886 | Price.............................. | 296/100 X |
| 3,378,058 | 4/1968 | Mattyas............................ | 160/118 |
| 3,069,199 | 12/1962 | Reardon............................ | 296/100 |
| 3,445,134 | 5/1969 | Pair.................................. | 296/27 |
| 2,043,858 | 6/1936 | Moore.............................. | 296/100 |

FOREIGN PATENTS OR APPLICATIONS

| | | | |
|---|---|---|---|
| 207,524 | 7/1924 | Great Britain....................... | 296/14 |

Primary Examiner—Robert R. Song
Attorney—John W. Malley et al.

[57] ABSTRACT

A truck box cover including two pairs of panels, each of which pairs has an outer panel and an inner panel. The outer panel is hingedly secured to the side wall of the truck box. The inner panel is hingedly secured to the outer panel. The cover can be folded from a position wherein the panels enclose the top of the box, to a position, wherein the panels of each pair are overlaying each other and are positioned outside their respective side wall, parallel to same. A six-panel embodiment is also disclosed. The cover is also provided with a foldable bulkhead.

10 Claims, 33 Drawing Figures

Patented Oct. 30, 1973

Patented Oct. 30, 1973

Patented Oct. 30, 1973

Patented Oct. 30, 1973

TRUCK BOX COVER

This invention relates to a truck box cover, particularly to a pick-up truck box cover.

In the art of pick-up bodies for light truck, it is frequently required by owners to have a cover on the truck box to protect the items carried on the truck from the weather or from pilferage etc.

Various types of truck box covers are in use nowadays which, for one reason or another, do not meet all the requirements of the users of pick-ups. The covers are usually comparatively expensive to manufacture. Most of the known covers are designed for a single purpose of merely covering the truck box and usually cannot be utilized in various other desirable functions, e.g. increasing the loading capacity of the box etc.

It is an object of the present invention to provide a comparatively inexpensive truck box cover by means of which the truck box can be closed and locked, the cover being capable to completely fold away or to be used for other purposes, such as load binder.

The truck box cover according to the present invention includes at least two pairs of panels, each pair of panels comprising an outer panel and an inner panel, a first hinge and a second hinge. The outer panel of each of the pairs of the panels is adapted to be hingedly secured in proximity to the upper edge of a side wall of said box by the first hinge, while the inner panel is hingedly secured to the outer panel by the second hinge. The hinges are spaced apart and substantially parallel to each other and to the upper edge of the side wall. The first hinge is of the type allowing for pivotal movement of said outer panel from a position in which the outer panel covers a portion of the box, to a substantially vertical position outside of the box. The second hinge is of a type allowing for pivotal movement of the inner panel from a substantially coplanar position with regard to said outer panel to a substantially parallel overlaying position with regard to the outer panel.

The invention will now be described by way of examples with reference to the accompanying drawings, in which.

Figure 1:
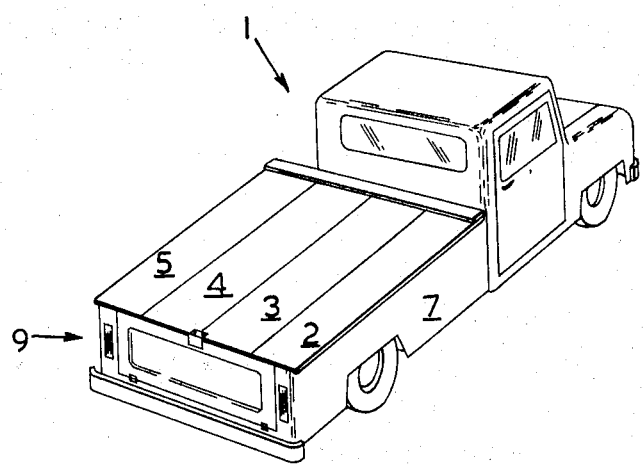
FIG. 1 is a simplified perspective view of the cover as used in a pick-up truck, showing the cover in its "closed" position.
Figure 2:
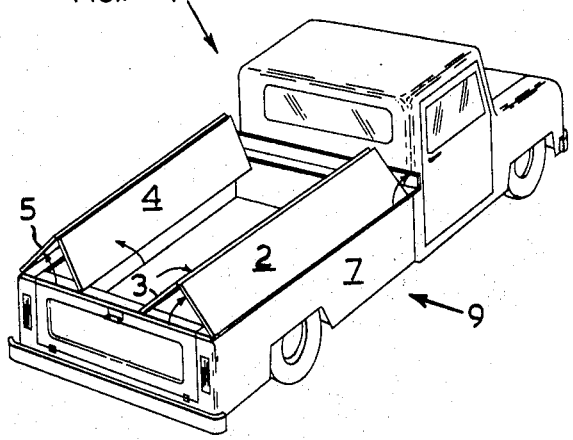
FIG. 2 is a view similar to that in FIG. 1, showing the cover in a stage wherein the box is being uncovered.

Turning now to the above drawings, and particularly to FIGS. 1 to 4, the invention is shown as used in a pick-up truck 1. The cover comprises four panels 2, 3, 4, 5 or two pairs of panels, 2, 3 and 4, 5. Each of the pairs of panels comprises an outer panel and an inner panel. Thus, the pair of panels 2, 3 has an outer panel 2 and an inner panel 3, and similarly the other pair of panels has an outer panel 5 and an inner panel 4.

Reference will now be made to one pair of panels 2, 3 only, it being understood that the second pair generally corresponds to the disclosure of the pair of panels 2, 3.

Figure 8:
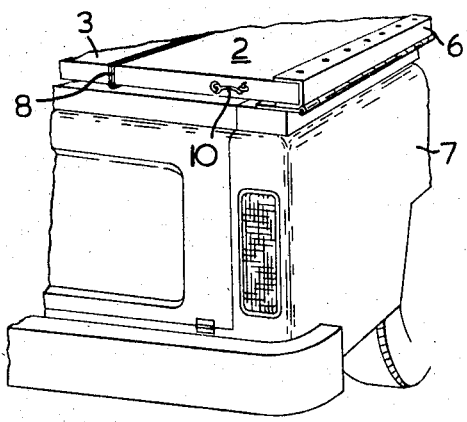
FIG. 8 is a more detailed perspective view of the right hand rear portion of the truck as shown in FIG. 1.
Figure 9:
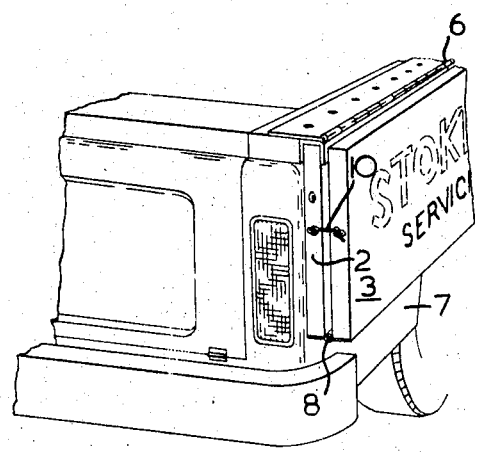
FIG. 9 is a detail similar to that of FIG. 8, but showing the truck as in FIG. 4.

The outer panel 2 is provided with a first hinge 6 (FIGS. 8, 9). The first hinge 6 can be mounted on the top edge of a side wall 7 of the pick-up box 9. In other words, the outer panel 2 is adapted to be hingedly secured in proximity to the upper edge of the side wall 7 by the first hinge 6.

Fixed to the other side of the outer panel 2 is a second hinge 8, hingedly securing the inner panel 3 to the outer panel 2.

The hinges 6, 8 are spaced apart and substantially parallel to each other and to the upper edge of the side wall 7.

It will be appreciated by comparing FIGS. 8 and 9, that the first hinge 6 is of the type allowing for pivotal movement of the outer panel 2 from a position shown in FIG. 8, in which the panel 2 covers a portion of the box to a position shown in FIG. 9, wherein the panel 2 is in a substantially vertical position outside of the box 9. In other words, the first hinge 6 makes it possible to turn the panel 6 about an angle of approximately 270°.

Figure 3:
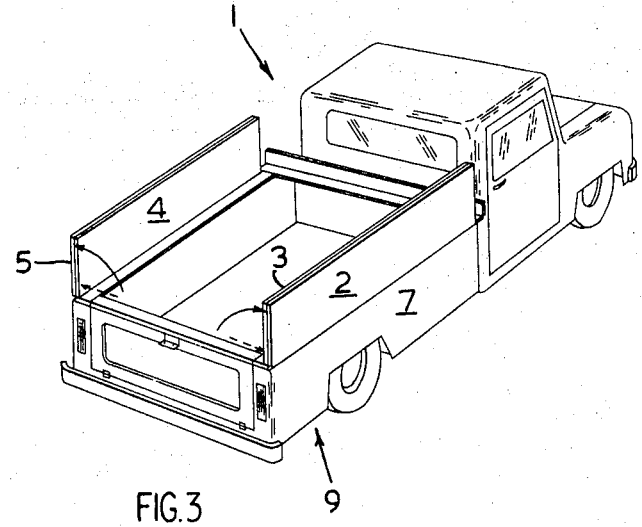
FIGS. 3 and 4 show the steps of folding the cover subsequent to the position as in FIG. 2.
Figure 4:
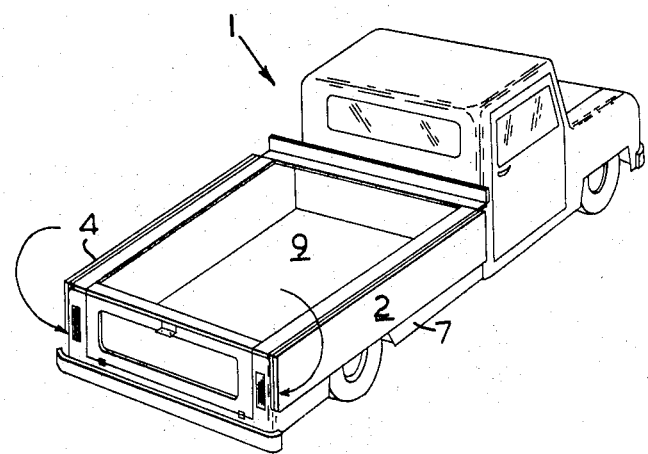

The second hinge 8 is of the type allowing for pivotal movement of the inner panel 3 from a substantially coplanar position with regards to the outer panel 2 (shown in FIG. 1 and FIG. 8), to a substantially parallel overlaying position with regard to the outer panel 2, as shown in FIGS. 3, 4 or 9. Generally, the second hinge 8 allows for pivotal movement of the inner panel 3 about approximately 180°.

Figures 5A, 5B:
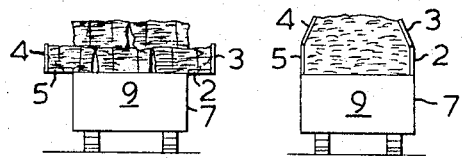
FIGS. 5 are sketches of examples of various positions in which the cover panels can be fixed.
Figures 5C, 5D:
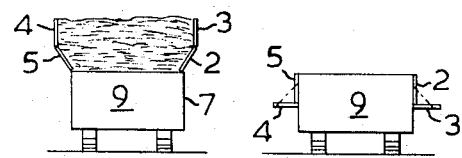
Figures 17A, 17B:
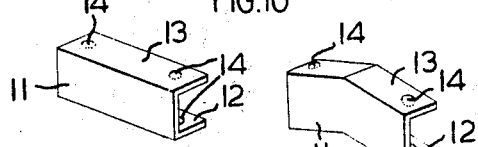
FIGS. 17 show, in perspective views, examples of means for fixing the mutual position of two adjacent panels at 180° (FIG. 17a) 140° (FIG. 17b) and 90° (FIG. 17c) angles.
Figure 17C:
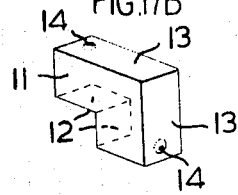

The cover according to the invention can be provided with means for selectively fixing the position of the inner panel 3 with regard to the outer panel at a predetermined angle as measured at the second hinge 8. Various devices can be used for this purpose, from among which at least two are shown in the drawings, thus, FIG. 9 shows a hook 10 which fixes the mutual position of the panels 2, 3 at an angle of substantially 0 degrees. FIGS. 17a, 17b and 17c show examples of fittings which can also be fixed over end edges of adjacent panels. The Fittings are, generally, channel members. Each of the fittings has a bottom wall 11 and two side walls 12, 13. The inner distance between the side walls 12, 13 corresponds to the thickness of the cover panels. The side walls 12, 13 can be provided with tapped holes 14 for bolts (not shown) fixing the fitting on the panels. Thus, if the fittings shown in FIG. 17a is engaged with the front and rear ends of the panels 2, 3 with the hinge 8 substantially in the middle of the fitting and perpendicular to the bottom wall 11, the two panels are prevented from relative turning about the hinge 8, in other words, they are fixed at an angle of 180°, as shown, e.g., in FIG. 5e or 5g. The fitting of FIG. 17b will fix the angle of approximately 140 degrees, while that shown in FIG. 17c is designed to fix panels 2 and 3 at a 90° angle (FIG. 5d). Apparently, the fitting can be modified to suit any predetermined mutual position between the two adjacent panels, the angles of 0°, 90° and 180° being most desirable.

Figures 5E, 5F:
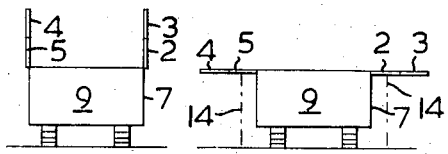
Figure 5G:
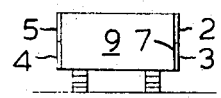

The cover according to the invention can further be provided with means for selectively fixing mutual positions of the outer panel 2 with regard to the side wall 7 of the pick-up box 9. Such means are well known per se and therefore need not be shown in the drawings. For example, they can have the configuration of angular brackets attachable to the side wall 7 to support the panel 2 in a predetermined position. Another embodiment may utilize supporting props, indicated in broken lines 13 in FIG. 5f. The angle between the panel 2 and the side wall 7 may be selected according to practical needs. Thus, FIGS. 5b and 5e show embodiments wherein the angle is 180°, whereby the outer panel 2 is positioned substantially upright and prallel to the side wall 7. In FIG. 5f the angle is 90° whereby the outer panel 2 is substantially horizontal and extends outside the box 9 along the upper edge of the side wall 7. A 0° angle is shown in FIG. 5g, wherein the panel 2 is substantially vertical, parallel to the side wall 7 and located outside the box 9. It will be appreciated that the above embodiments show only few of numerous possibilities of mutual arrangements of the panels.

Figures 6A, 6B:
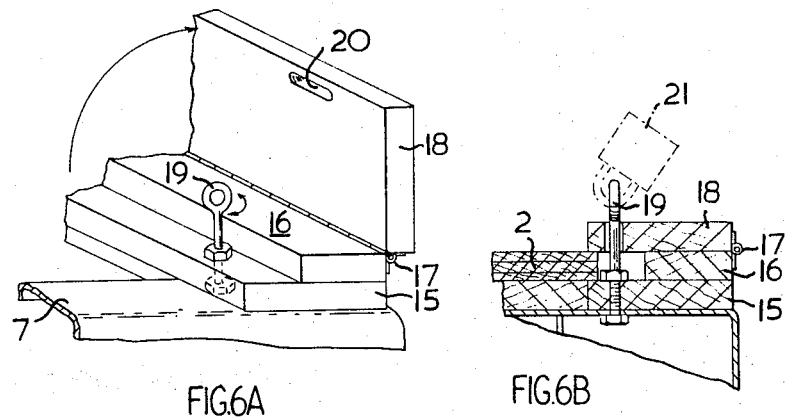
FIGS. 6 show the detail of a locking flap in a perspective view (FIG. 6a) and in section (FIG. 6b)

It may be desirable to lock the cover in a position shown in FIG. 1 wherein the panels 2, 3, 4, 5 cover the top of the box 9. One example of locking means for this purpose is shown in FIGS. 6a and 6b and in FIG. 1. It consists of a base plate 15 extending along the top of a front end wall of the box 9. Fixed to the base plate 15 is a hinge plate 16 on the edge of which is mounted one side of a hinge 17 the other side of same being fixed to a flap plate 18. Fixed to the base plate 15 is an eye 19 arranged to pass through a slot 20 in the flap plate 18, when the plate 18 is turned to a horizontal position shown in FIG. 6b, wherein the end of the flap plate 18 covers front ends of the panels 2, 3, 4, 5 (the panel 2 being shown in FIG. 6b, but not in FIG. 6a). The eye 19 can be provided with a padlock 21 to prevent an unauthorized opening of the flap plate 18. In general terms, the above locking means include a plate hingedly secured at the upper edge of an end wall of the box 9, said plate 18 being adapted to be locked in a substantially horizontal position, whereby the plate overlaps end portions of the panels 2, 3, 4, 5.

Figures 7A, 7B:
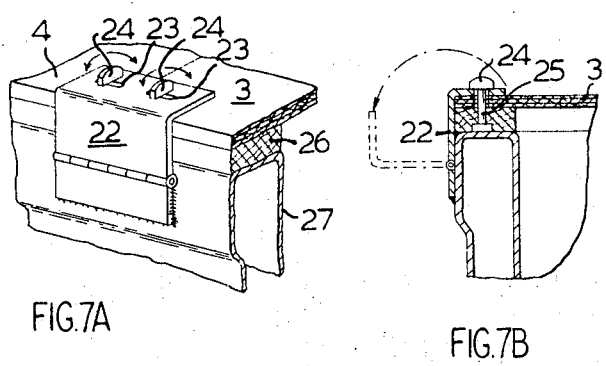
FIG. 7 shows one example of means for holding the cover in a closed position, both in a perspective (FIG. 7a) and in a section (FIG. 7b) view.

The opposite end portions of the cover can be provided with a hold-down angular plate 22 (FIG. 7a) with slots 23 receiving turnable wing heads 24 mounted on studs 25 embedded in the base plate 15, fixedly supported by the end wall 27 of the box 9.

Figure 22:
FIG. 22 is a detailed rear view of still another embodiment of the invention including a side wall provided with a recess for the cover panels.

The side wall 7 of the box 9 can be provided with a horizontal ledge recess 28 for receiving the panels 2, 3, when they are in a folded position. The recess is shown in FIG. 22. The depth D preferably corresponds to at least the sum of thicknesses of the panels 2, 3 to accommodate same.

Figure 14:
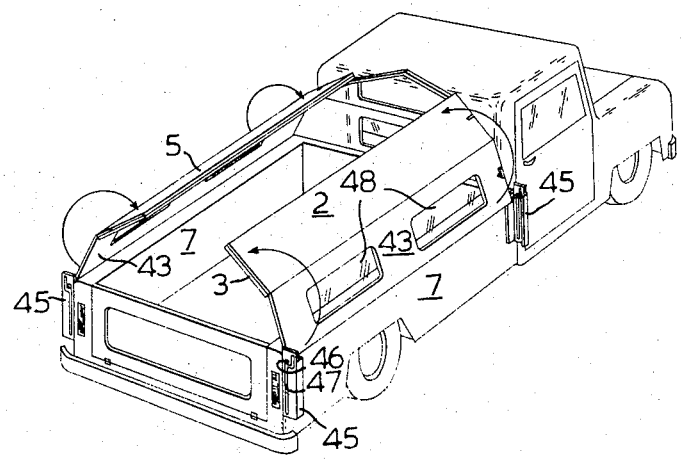
Figure 15:
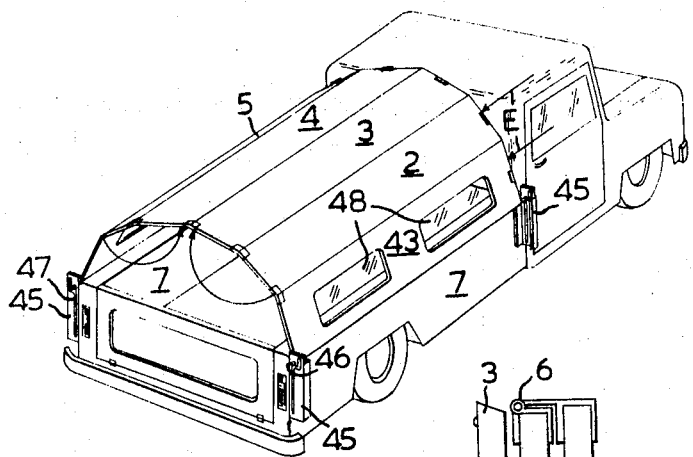
Figure 16:
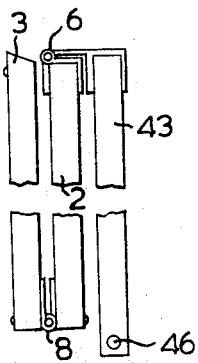
FIG. 16 is a schematic detail showing one embodiment of mutual arrangement of the hinges used in one pair of panels and included in the six-panel version as shown in FIG. 10.
Figure 18:
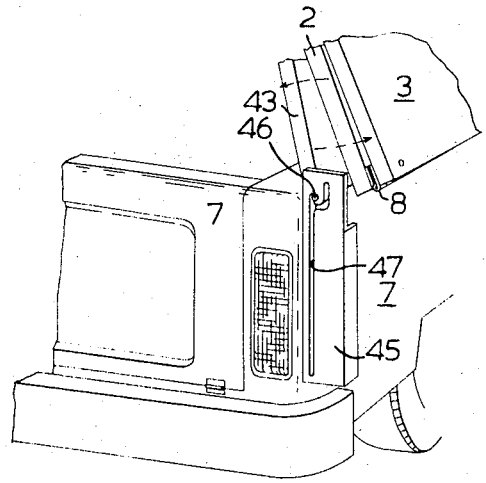
FIG. 18 is a perspective view of a detail showing an example of unfolding the six-panel version.

FIGS. 10 to 16 show still another embodiment of the present invention, wherein the outer panel is hingedly secured to a side panel, slidably secured to the side wall of the truck box. As seen in FIGS. 16 and 18, this embodiment includes the outer panel 2, 1 side of which is hingedly connected to the inner panel 3 by the 180° hinge 8. The other side of the outer panel 2 is hingedly secured to a side panel 43, by means of the 270° hinge 6.

Figure 10:
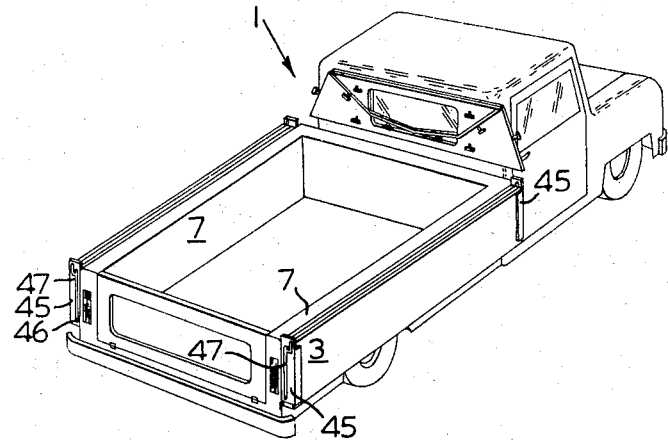
FIG. 10 is a schematic perspective view of a pick-up truck with a six-panel version of the invention, with the panels in a folded position.
Figure 10A:
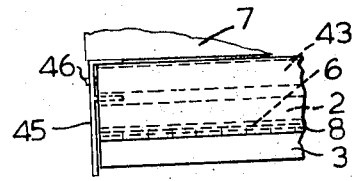
FIG. 10a is a top plan view of a corner of the box, showing another embodiment of the version as shown in FIG. 10.
Figure 11:
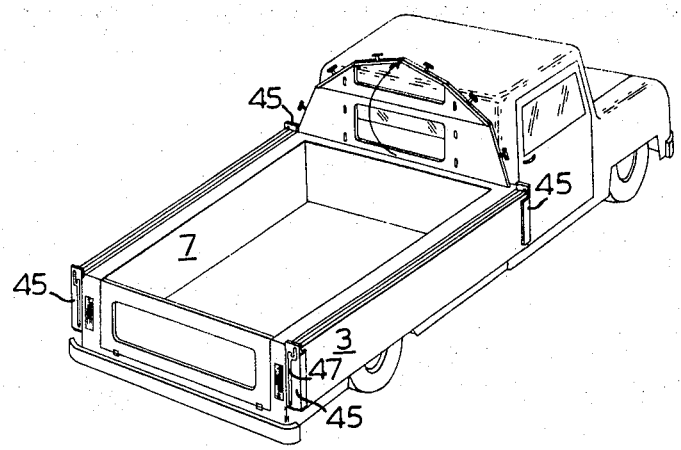
FIGS. 11, 12, 13, 14 and 15 show the sequence of erecting the cover version as in FIG. 10.
Figure 12:
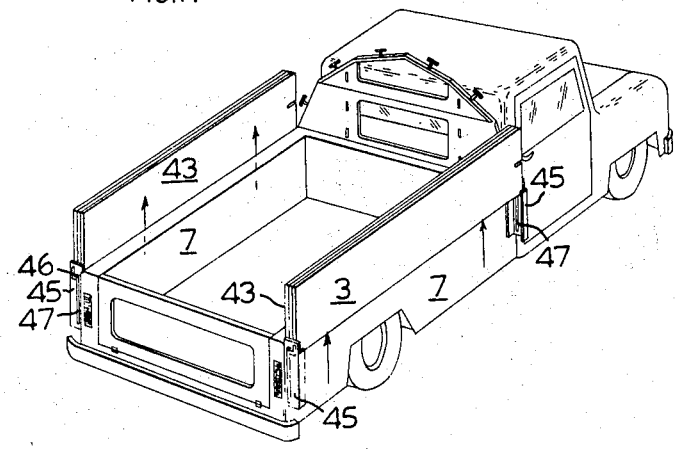
Figure 13:
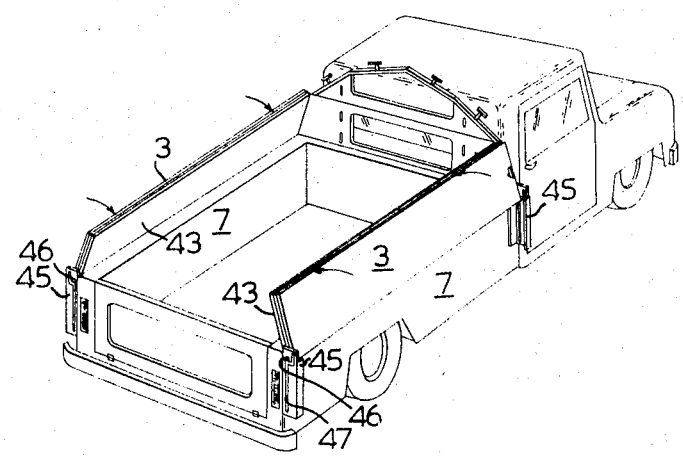

As seen from FIG. 10a, the side panel 43 is received in a holder 45, which is fixed to the side wall 7. The holder 45 defines an upright slide channel, the width of which provides for slidably receiving the side panel 43 (FIG. 10a), or in a modified embodiment, all three panels 3,2, 4,5 (FIGS. 10, 11, 12, 13).

Fixed to the end edges of the side panel 43 are slide pins, 1 at each end of the panel 43 each pin is received in a guide slot 47. The upper part of the slot forms a horizontal portion whereby the upper end of the slot 47 can support the pin 46 and thus the panel 43 in an expanded position, as shown for instance in FIG. 13, after the panel 43 has been slid upwardly. In general terms, the side panel 43 is slidably secured to the side wall 7 for substantially vertical sliding movement from a folded position (FIG. 10) wherein the side panel 43 overlays the outer surface of said wall 7, to an expanded position (FIG. 14) etc. wherein the lower edge of the side panel 43 is adjacent to the upper edge of said side wall 7. The shape of the upper portion of the slot 47 constitutes one example means for fixing the side panel 43 in the expanded position. The cover according to the latter embodiment can be used for instance in camping truck, wherein the side panel can be provided with windows 48 (FIG. 14, 15).

Figure 19:
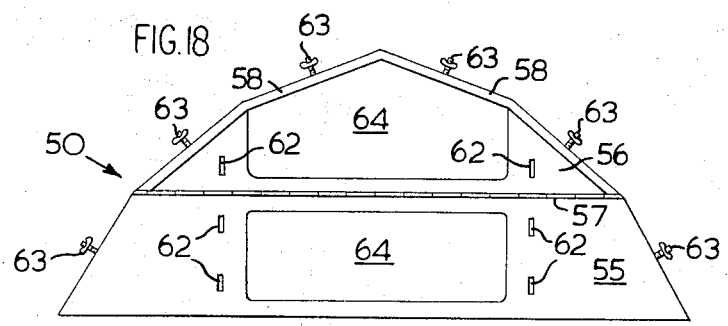
FIG. 19 is a rear view of an example of a bulkhead for the six-panel version with the bulkhead shown in unfolded stage.
Figures 20, 21:
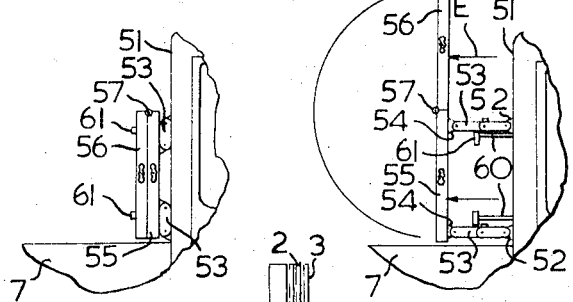
FIG. 20 is a side view of the bulkhead as mounted on a pick-up truck showing the bulkhead in a folded position.
FIG. 21 is a view similar to that of FIG. 20, showing the way of unfolding the bulkhead.

The cover may also include a bulkhead. The example of the bulkhead 50 shown in FIG. 19, 20, 21, is intended to be used in the six-panel version as shown in FIG. 10, 11, etc., it being understood that a more or less similar embodiment of the bulkhead can also be used in the previously disclosed four-panel version (FIG. 1). As can be observed from FIG. 19, 20 and 21 the foldable bulkhead 50 can be mounted on the rear wall 51 of the truck cabin. Fixed to the rear wall 51 are four brackets 52. Pivotally connected to each of the brackets 52 is one end of a linkage 53, the opposite end of each linkage 53 being pivotally connected to a bracket 54, fixed to a lower panel 55. Hingedly secured to a lower panel 55 is an upper panel 56, by means of a 180° hinge 57. As seen in FIG. 19, the hinge 57 is arranged at the upper edge of the lower panel 55. FIG. 21 shows that the panels 55, 56 are substantially coplanar, vertical and perpendicular to the side wall 7, when the bulkhead 50 is in an unfolded or expanded position.

It is of advantage to provide at least the upper panel 56 with a perimeter frame 58. The perimeter of the expanded bulkhead 50 has substantially the shape of the cross-section of an expanded assembly of the panels 43, 2, 3 4, 5, shown in FIG. 15.

The above mentioned linkages 53 constitute one example of means for selectively shifting the position of the lower panel 55 in a substantially horizontal direction E (FIG. 21).

Mounted on the rear wall 51 of the cabin are four studs 60 with turnable wing heads 61. The heads can pass through slots 62 in the panels 55, 56. As seen in FIG. 20, the heads 61 can hold the panels 55, 56 in a folded position, or, when turned to be parallel to the slots 62, they will allow unfolding of the bulkhead and its shifting in the direction E, to bring the bulkhead into engagement with the directed assembly of the side, outer and inner panels 43, 2, 3, 4, 5. The front ends of the panels 43, 2, 3, 4, 5 can be provided with suitable slots or openings (not shown) for receiving bolts 63 to fit the bulkhead 50 with the rest of the cover assembly, by means of wing nuts on the bolts 63.

The panels 55 and 56 of the bulkhead can be provided with transparent openings 64 to clear the rear view window of the truck cabin.

The erection sequence of the six-panel version follows the succession of FIG. 11, 12, 13, 14 and 15. First the bulkhead 50 is unfolded but not shifted off the cabin. Then the panels 43, 2, 3, 4, 5 are shifted upwards (FIG. 12), arranged in an inclined position (FIG. 13) and unfolded (FIGS. 14, 15). Finally the bulkhead 50 is shifted into engagement with the panels 43, 2, 3, 4, 5 as indicated by arrows E in FIG. 15.

The advantage of the embodiment shown in FIG. 10a is in that the panels 2 and 3 can be used in the same manner as in the four-panel version, without the need for sliding the panel 43 upwards.

Although various embodiments of the present invention have been shown, it will be apparent that it is possible to provide still further modifications. Thus, the proportion of various parts can be modified to a great extent. For instance, the proportions of the two panels 55, 56 can be changed to suit particular needs and to differ rather substantially from the embodiments shown in the drawings. One useful embodiment has been tested wherein the roof of the truck cabin is 22 inches above the top edge of the truck box, the lower panel 55 being 20 inches high and the upper panel 56 being also approximately 20 inches high. The transparent openings 64 of this particular embodiment correspond to each other.

However, these and many other modifications do not depart from the scope of the present invention as defined in the following claims.

I claim:

1. In combination, a truck box defined by a bottom wall of generally rectangular configuration, a pair of generally parallel side walls and end walls extending between corresponding ends of the side walls, said side walls and end walls extending above the bottom wall and terminating in upper edges disposed in a generally horizontally extending plane and a cover assembly for selectively closing said truck box and providing open access thereto, the improvement in combination therewith which comprises said cover assembly including:

a plurality of generally planar cover panels of a size and shape sufficient to cover the truck box along the upper edges of the side and end walls thereof when said panels are disposed in a box closing position wherein the panels extend in a horizontal plane generally coincident with the aforesaid horizontal plane of the upper edges of said side and end walls and are disposed in generally side-by-side relation with respect to each other in an arrangement which includes an outer panel adjacent each side wall of the box and an inner panel inwardly of each outer panel.

means operatively connected with each outer panel for mounting said outer panel for pivotal movement about a horizontal axis adjacent to and generally parallel with the upper edge of the associated side wall from said box closing position through an arc of the order of 270° into a box access position wherein said outer panel is disposed generally vertically downwardly from the pivotal axis thereof in generally parallel relation to the exterior of the associated side wall, means operatively connected between each outer panel and the associated inner panel mounting the inner panel for pivotal movement with respect to the associated outer panel and for movement with the associated outer panel from said box closing position to a box access position wherein said inner panel is disposed in generally vertically coextensive parallel relation with the associated outer panel outwardly thereof, and means for retaining each inner panel in said box access position in relation to the associated outer panel.

2. The combination as defined in claim 1 wherein each outer panel mounting means comprises a first hinge element fixed adjacent the upper edge of the associated side wall and extending horizontally outwardly thereof, a second hinge element fixed to the outer edge portion of the associated outer panel and a pivot pin hingedly interconnecting said first and second hinge elements.

3. The combination as defined in claim 2 wherein each inner panel mounting means comprises a third hinge element fixed to the inner edge portion of the associated outer panel, a fourth hinge element fixed to the outer edge portion of the inner panel and a second pivot pin hingedly interconnecting said third and fourth hinge elements.

4. The combination as defined in claim 1 wherein each inner panel mounting means comprises a first hinge element fixed to the inner edge portion of the associated outer panel, a second hinge element fixed to the outer edge portion of the inner panel and a pivot pin hingedly interconnecting said first and second hinge elements.

5. The combination as defined in claim 1, further including locking means for locking said panels in said box closing position.

6. The combination as defined in claim 5 wherein said locking means includes a plate hingedly secured at the upper edge of the front end wall of said box, said plate being adapted to be locked in a substantailly horizontal position in overlapping relation with the forward end portions of said panels.

7. The combination as defined in claim 1 wherein each outer panel mounting means comprises a first hinge element fixed to the outer edge portion of the outer panel, a third panel of a size and shape similar to said outer panel having a second hinge element on one edge portion thereof, a pivot pin hingedly interconnecting said first and second hinge elements and means mounting said third panel on said side wall (1) for vertical movement with respect thereto between an upper vertically extending position and lower vertically extending position wherein said pivot pin is coincident with the aforesaid axis of pivotal movement of the outer panel and (2) for pivotal movement with respect to said side wall from said upper position arcuately inwardly about an axis disposed parallel with the pivotal axis of said pivot pin into an operative position in which all of the panels can extend in canopy fashion over said truck box.

8. The combination as defined in claim 7, further including a foldable front bulkhead mounted adjacent the front end wall of said box, said bulkhead including an upper panel and a lower panel hingedly connected to each other at the upper substantially horizontal edge of said lower panel for pivotal movement of said upper panel into an unfolded position in which the lower panel and the upper panel are substantially coplanar, vertical and perpendicular to the side walls of said box.

9. The combination as defined in claim 8 wherein at least a part of the perimeter of the bulkhead is defined by a frame, said perimeter having substantially the shape of the cross-section of said cover panels when disposed in canopy fashion over said truck box.

10. The combination as defined in claim 8 wherein said lower panel is provided with means for selectively shifting the position of said lower panel in a substantially horizontal direction whereby the bulkhead can be first unfolded and then shifted by said shifting means into an engagement with the front portions of the cover panels to support said cover panels in their operative position in canopy fashion, at least a part of the perimeter of the unfolded bulkhead corresponding to the cross-section of the cover panels when disposed in said operative position in canopy fashion.

* * * * *